United States Patent [19]

Takenaka et al.

[11] Patent Number: 5,173,285
[45] Date of Patent: Dec. 22, 1992

[54] PROCESS FOR THE MANUFACTURE OF HYDROGEN SULFIDE

[75] Inventors: Senji Takenaka, Yokosuka; Seiichi Matsuoka, Anjyo; Tsutomu Toida, Handa; Takao Takinami, Handa; Nobuhiro Yamada, Handa; Kouzi Tamura, Chita, all of Japan

[73] Assignee: JGC Corporation, Tokyo, Japan

[21] Appl. No.: 779,127

[22] Filed: Oct. 16, 1991

Related U.S. Application Data

[63] Continuation of Ser. No. 335,187, Apr. 7, 1989, abandoned.

[30] Foreign Application Priority Data

Apr. 7, 1988 [JP] Japan .................................. 63-86086
Aug. 17, 1988 [JP] Japan ................................ 63-204439

[51] Int. Cl.$^5$ ............................................. C01B 17/16
[52] U.S. Cl. ..................................... 423/563; 423/564; 423/565
[58] Field of Search ........................ 423/563, 564, 565

[56] References Cited

U.S. PATENT DOCUMENTS

| | | | |
|---|---|---|---|
| 1,700,578 | 1/1929 | Bacon ................................. | 423/563 |
| 2,214,859 | 9/1940 | Maude et al. ...................... | 423/564 |
| 2,474,066 | 6/1949 | Preisman et al. ................. | 423/564 |
| 2,876,070 | 3/1959 | Roberts ............................. | 423/563 |
| 2,876,071 | 3/1959 | Updegraff ......................... | 423/563 |
| 2,965,455 | 12/1960 | Maude et al. ...................... | 423/564 |
| 3,851,049 | 11/1974 | Smith ................................ | 423/564 |
| 4,046,866 | 6/1977 | Hurlburt et al. .................. | 423/533 |
| 4,094,961 | 6/1978 | Beavon et al. .................... | 423/564 |

FOREIGN PATENT DOCUMENTS

| | | | |
|---|---|---|---|
| 1113446 | 9/1961 | Fed. Rep. of Germany ...... | 423/564 |
| 44-1686 | 1/1969 | Japan . | |
| 46-5572 | 2/1971 | Japan ................................ | 423/563 |
| 63-139007 | 7/1989 | Japan . | |
| 398405 | 7/1924 | United Kingdom . | |
| 558432 | 9/1932 | United Kingdom . | |
| 1193040 | 5/1970 | United Kingdom . | |

*Primary Examiner*—Gary P. Straub
*Assistant Examiner*—Timothy C. Vanoy
*Attorney, Agent, or Firm*—Darby & Darby

[57] ABSTRACT

The present invention relates to a process for the manufacture of hydrogen sulfide by reacting sulfur and hydrogen which comprises two hydrogenation reactions. The first hydrogenation reaction of the present invention comprises the steps of supplying hydrogen gas in a reactor containing sulfur at least a part of which is in a liquid phase at a temperature of not lower than 250° C., and reacting the liquid sulfur and the hydrogen gas to produce a crude hydrogen sulfide effluent gas in the reactor. The sulfur vapor contained in the effluent gas is further reacted with fleshly added hydrogen gas in the second hydrogenation reaction to further concentrate the resulting hydrogen sulfide.

12 Claims, 5 Drawing Sheets

PROCESS FOR THE MANUFACTURE OF HYDROGEN SULFIDE

This is a continuation of application Ser. No. 07/335,187 filed Apr. 7, 1989 and abandoned.

BACKGROUND OF THE INVENTION

1. Field of the Invention

The present invention relates to a process for the manufacture of hydrogen sulfide by reacting sulfur with hydrogen gas.

2. Description of the Prior Art

Processes for the manufacture of hydrogen sulfide are well known in which sulfur and hydrogen are reacted in a gas phase. These conventional processes, however, are disadvantageous in that upon reaction between sulfur and hydrogen, the temperature of the reaction system increases considerably as a result of reaction heat, thus requiring control of the temperature of the reactor.

A well-known countermeasure for obviating the disadvantage was to use hydrogen in excess amounts and sulfur in smaller amounts in order to restrict the amount of reaction therebetween to some extent to reduce the increase in the temperature of the reaction system. However, this method is unsatisfactory because conversion rate of hydrogen is low, for example, as low as 10% in terms of the concentration of hydrogen sulfide produced, which means the efficiency of manufacture of hydrogen sulfide is low. Furthermore, the use of large amount of hydrogen results in that not only the size of production apparatus to be used per unit amount of hydrogen sulfide produced becomes large but also large installment is needed for recycling large amounts of hydrogen gas and running accompanied absorption and regeneration steps. These inevitably lead to the use of large, expensive manufacture apparatus.

Further approach to improve the above-described conventional process, was a process in which at least two gas phase reaction rooms which are communicated with each other. Each room is equipped at the inlet of the reaction room with a sulfur inlet room for introducing and gasifying sulfur hydrogen gas heated to a temperature sufficient for gasify sulfur is introduced through the gas phase reaction rooms in series while supplying sulfur in each of the sulfur inlet rooms separately to perform reaction between sulfur and hydrogen as described in Japanese Patent Publication (Kokoku) No. 46-5572 published Feb. 12, 1971.

The above-described process is still disadvantageous from economical viewpoint in that only 1 mol % of $S_8$ (sulfur vapor) can be reacted in order to prevent increase in temperature above 100° C. in a single step and as a result many steps are required for obtaining hydrogen sulfide in high concentration.

SUMMARY OF THE INVENTION

Therefore, an object of the present invention is to obviate the above-described disadvantages of the conventional processes and provide a process for the manufacture of hydrogen sulfide in high concentration by efficiently controlling the reaction temperature between sulfur and hydrogen.

As a result of intensive research, it has now been found that the introduction of hydrogen gas in liquid phase sulfur leads to the manufacture of hydrogen sulfide in high concentration without increasing the reaction temperature excessively.

The present invention provides a process for the manufacture of hydrogen sulfide, comprising contacting hydrogen gas with sulfur at least a portion of which is in liquid phase in a reactor.

In the process for the manufacture of hydrogen sulfide according to the present invention, the reaction heat generated by the reaction between sulfur and hydrogen is absorbed by gasification of liquid sulfur in the reactor, thus preventing increase in the reaction temperature above a predetermined level, and gasified sulfur can be removed with ease by cooling a product gas. Therefore, hydrogen sulfide in high concentration can be manufactured efficiently in a single step or using a single reactor.

Furthermore, according to the process of the present invention, it is no longer necessary to use a large excess amount of hydrogen gas in order to control the reaction temperature, and the flow rate of hydrogen gas to be used in the manufacture of hydrogen sulfide can be reduced.

Since hydrogen sulfide in high concentration can be obtained independently of the vapor pressure of sulfur, it is possible to use high pressures in the manufacture process, which leads to reduction in size of the manufacture apparatus.

DETAILED DESCRIPTION OF THE INVENTION

Figure 1:
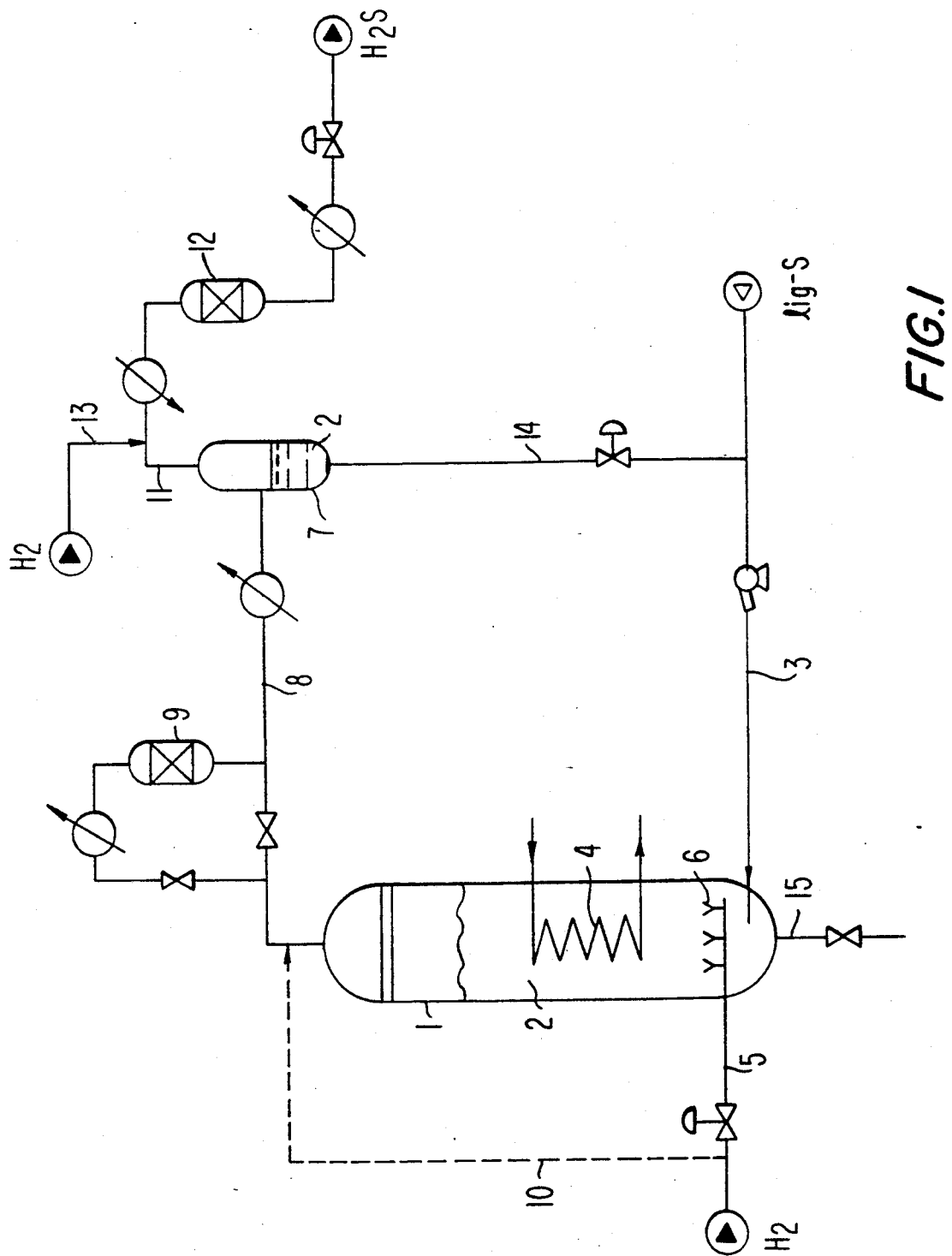
FIG. 1 is a schematical view of a manufacture apparatus suitable for performing a process for the manufacture of hydrogen sulfide according to one embodiment of the present invention.

The reaction between sulfur and hydrogen is performed at temperatures at which at least a part of sulfur is in liquid phase. When the reaction temperature is too low, not only the reaction speed decreases but also the viscosity of the liquid sulfur increases. On the other hand, when the reaction temperature is too high, the vapor pressure of sulfur enhances, resulting in increase in the amount of sulfur entrained by the resulting gas to aggravate the efficiency of manufacture and also in corrosion of various parts or portions of a reactor. Therefore, the reaction temperature is selected appropriately also in relation to pressures under which the reaction proceeds. The reaction temperature is preferably not lower than 250° C., more preferably, 250° to 600° C., and most preferably from 300° to 450° C. The reaction pressure is usually from 0.3 to 30 Kg/cm$^2$G (gauge pressure), preferably 3 to 30 Kg/cm$^2$G.

Examples of hydrogen gas used in the process of the present invention may be steam reformed hydrogen gas obtained by steam reforming liquid propane gas (LPG), naphtha or a like, electrolytic hydrogen, recovered hydrogen recycled from other plants, and the like.

The reaction between sulfur and hydrogen can be performed with or without catalysts.

Suitable examples of the catalyst which can be used in the process of the present invention include oxides and sulfides of cobalt-molybdenum or nickel-molybdenum, and nickel sulfide.

Now, the present invention will be described in detail referring to FIG. 1 which shows an apparatus suitable for the process for the manufacture of hydrogen sulfide according to the present invention. In manufacturing hydrogen sulfide, a reactor 1 is used, in which liquid sulfur 2 is supplied from a liquid sulfur source through a pipeline 3. The liquid sulfur 2 is heated to a predetermined reaction temperature, preferably at at least 250° C., with a heat exchanger 4 for heating/cooling equipped in the reactor 1. On the other hand, hydrogen gas is blown in the liquid sulfur 2 in the reactor 1 via a supply pipeline 5 from a nozzle 6 provided at the bottom of the reactor. This brings hydrogen gas in contact with the liquid sulfur 2 in the absence of catalysts to cause reaction therebetween to produce hydrogen sulfide (H$_2$S).

The temperature inside the reactor is kept substantially at a constant temperature as a result of equilibrium between the generation of heat by the reaction between hydrogen and liquid sulfur and absorption of heat by evaporation of liquid sulfur. If the reaction heat becomes overmuch and the temperature inside the reactor exceeds a predetermined level, the inside of the reactor is cooled with the heat exchanger 4 to lower the inner temperature to a predetermined level.

An effluent gas from the reactor 1, which contains sulfur vapor, unreacted hydrogen, methane entrained by hydrogen gas and impurity gases in addition to hydrogen sulfide is fed to a condenser 7 via pipeline 8. In the condenser 7, the gas fed via pipeline 8 is cooled to condense sulfur vapor mixed therein to recover the liquid sulfur 2. The cooling of the gas with the condenser 7 can be performed by heat exchange with water cooling, heat exchange with a gas such as hydrogen gas used as a starting material or air, direct contact with liquid sulfur used as a starting material, and the like. The cooling temperature is preferably from about 150° C. down to about 130° C. in order to condense as much as sulfur vapor contained in the resulting product gas and prevent its solidification.

If desired, whole or a part of the gas flowing out from the reactor 1 can be supplied to a hydrogenation reactor 9 on the way to the condenser 7 and heated in the hydrogenation reactor 9 packed with a hydrogenation catalyst in order to further react sulfur vapor entrained by the product gas with hydrogen gas to convert sulfur vapor into hydrogen sulfide. In this case, hydrogen gas may be supplied from the hydrogen source via a pipeline 10 to lower the concentration of sulfur vapor, thus preventing excessive increase in temperature due to reaction heat.

The separated gas after the removal of liquid sulfur 2 in the condenser 7 is taken out from the condenser 7 via a pipeline 11.

The separated gas taken out from the pipeline 11 contains mainly hydrogen sulfide, unreacted hydrogen gas, and impurity gases such as methane contaminating the hydrogen gas used as a starting material as well as saturated sulfur vapor formed in the condenser 7, and is usually subjected to further purification to obtain hydrogen sulfide gas having a high purity.

For example, such purification operation of the separated gas can be performed as follows. That is, in the apparatus shown in FIG. 1, the separated gas taken out from the condenser 7 via the pipeline 11 is fed to a hydrogenation reactor 12 to react sulfur vapor with hydrogen. If the separated gas contains no hydrogen gas, hydrogen gas is supplied from a hydrogen source via a pipeline 13 and the resulting mixed gas is introduced in the hydrogenation reactor 12 and heated in order to subject hydrogen and sulfur vapor in the mixed gas to gas phase contact reaction to produce hydrogen sulfide. This reduces the content of sulfur vapor in the separated gas and increases that of hydrogen sulfide.

Although the liquid sulfur 2 is usually supplied from a liquid sulfur source via the pipeline 3, the liquid sulfur 2 recovered from the condenser 7 may be supplied to the reactor 1 via a pipeline 14.

When the liquid sulfur 2 in the reactor 1 is to be discharged in case of maintenance of the reactor or otherwise in necessity, discharge operation can be run by discharging the liquid sulfur via a discharge pipeline 15 connected to the reactor 1 at the bottom thereof.

In the process of the present invention, a part of hydrogen sulfide produced is converted to polyhydrogen sulfide (H$_2$S$_x$) in liquid sulfur, resulting in decrease in the viscosity of the reaction system.

As is well known, hydrogen sulfide is used as an intermediate compound for preparing various chemical products, and in some cases presence of polyhydrogen sulfide could result in the deterioration of the quality or value of such chemical products. In such occasions, the use of the hydrogenation reactor 12 is advantageous in order to obtain hydrogen sulfide which contains substantially no sulfur vapor nor polyhydrogen sulfide.

As for the equilibrium between the polyhydrogen sulfide and hydrogen sulfide, it is shifted to a hydrogen sulfide-rich side in an atmosphere in which the reaction temperature is low and the partial pressure of hydrogen gas is high, and it is therefore preferred to perform the hydrogenation reaction at a temperature not higher than 300° C., preferably 200° to 250° C. and lower than the reaction temperature in the reactor 1.

Figure 2:
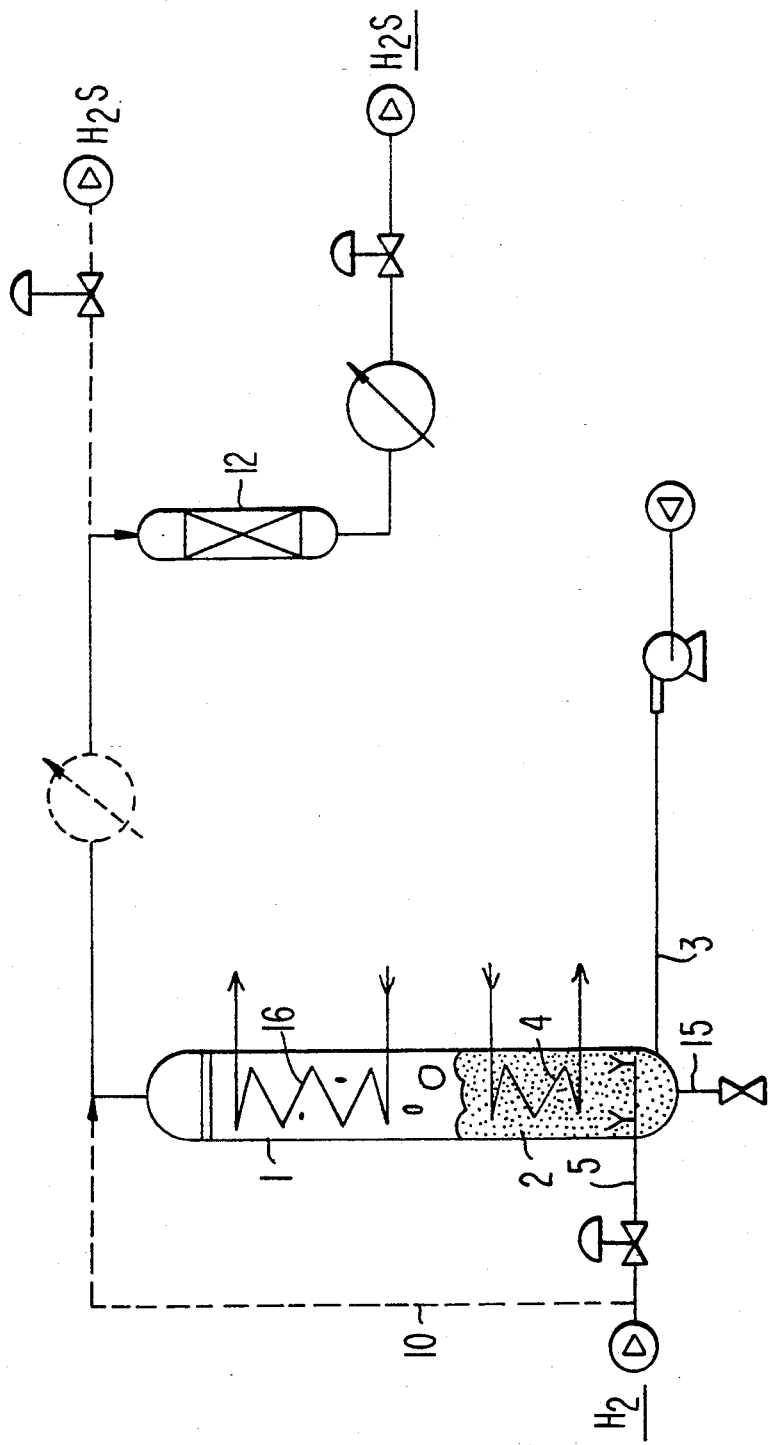
FIG. 2 is a schematical view of a manufacture apparatus used in a process for the manufacture of hydrogen sulfide according to a variation of the embodiment shown in FIG. 1.

In a variation of the above embodiment, a cooler 16 can be provided in the reactor 1 above the heat exchanger 4, more particularly in the gas phase as shown in FIG. 2 to generate refluxing inside the reactor 1, the pipelines 8 and 14 can be omitted, thus enabling the simplification of the manufacture apparatus.

Furthermore, the hydrogenation reactor 12 for performing final refining or hydrogenation reaction can also be omitted by setting up the cooling temperature to an appropriate level to control the quantity of sulfur vapor entrained by the mixed gas mainly composed of hydrogen gas and hydrogen sulfide. This also adds to further simplify the manufacture apparatus.

According to the above-described embodiment and its variation in which no catalyst is used, maintenance and management of the manufacture apparatus can be facilitated.

Figure 3:
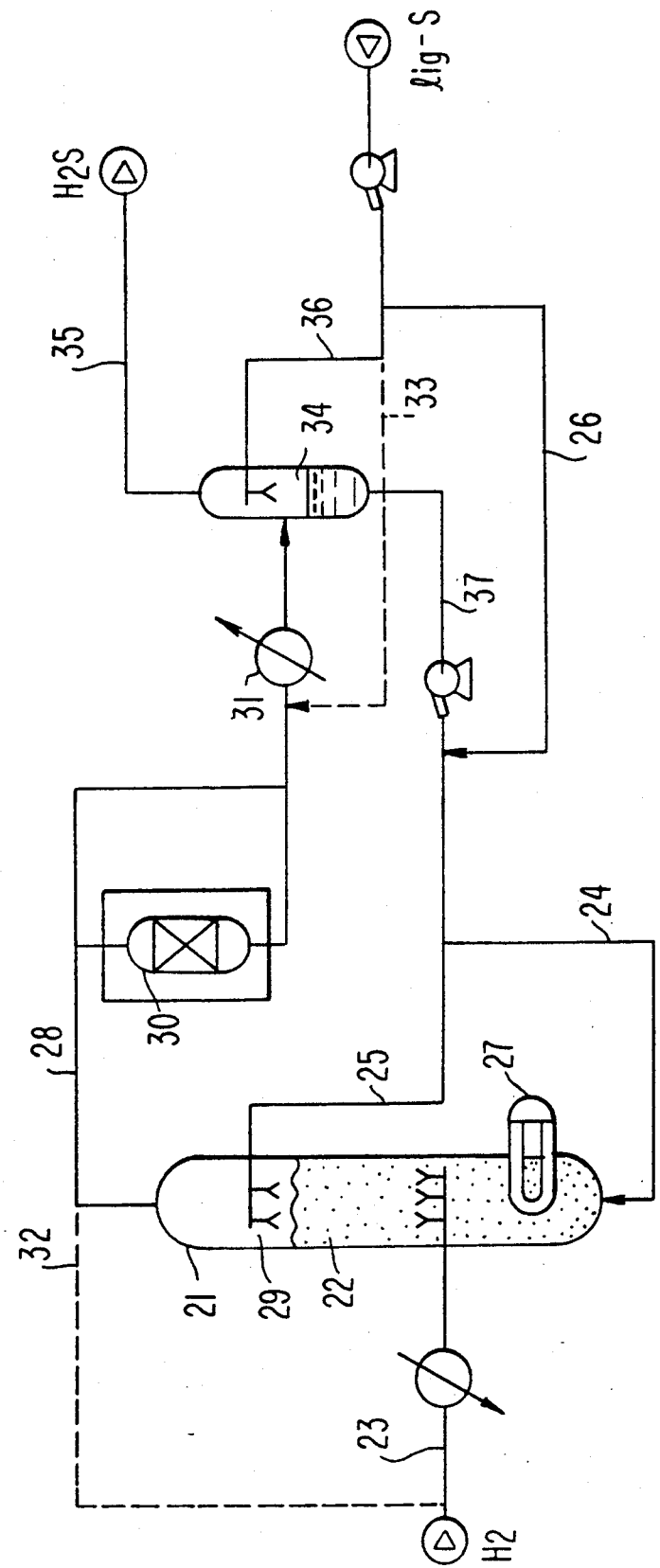
FIG. 3 is a schematical view of a manufacture apparatus suitable for performing a process for the manufacture of hydrogen sulfide according to another embodiment of the present invention.

Now, referring to FIG. 3, an embodiment of the process for the manufacture of hydrogen sulfide is explained in which a catalyst is used. In FIG. 3, reference numeral 21 indicates a reactor in which liquid sulfur 22 contains a hydrogenation catalyst and forms a reaction phase. Heated hydrogen gas from a hydrogen gas source is supplied to the liquid sulfur in the reactor 21 via a pipeline 23. On the other hand, liquid sulfur is supplied to the reactor 21 from a liquid sulfur source via pipelines 24 and 25. The liquid sulfur 22 and hydrogen gas are subjected to gas-liquid contact reaction in the presence of a catalyst to produce hydrogen sulfide.

Sulfur to be supplied from the liquid sulfur source is usually fed via a pipeline 26, which communicates with the pipelines 24 and 25, together with a recycling liquid sulfur explained hereinbelow.

Inside the reactor 21 is provided a heater 27 for heating the reactor at the time of starting the manufacture of hydrogen sulfide.

In this embodiment too, the temperature of liquid sulfur in the reactor 21, i.e., reaction temperature, is kept at a constant level due to balance between the generation of reaction heat generated by the reaction of sulfur with hydrogen and the absorption of heat due to the evaporation of liquid sulfur. The reaction temperature is preferably from 250° C. to 450° C. When the reaction temperature is below 250° C., not only the reaction speed is low but also the viscosity of liquid sulfur increases. On the other hand, when the reaction temperature exceeds 450° C., the catalyst used is deteriorated.

In the same manner as in the previous embodiment shown in FIG. 1, the effluent gas flowing out from the reactor 21 contains sulfur vapor, unreacted hydrogen gas and methane or a like impurity gas entrained by hydrogen gas in addition to hydrogen sulfide, and the effluent gas is discharged from the reactor 21 via a pipeline 28. In this case, it is also possible to reduce the amount of sulfur vapor entrained by supplying whole or part of the liquid sulfur to be supplied to the reactor 21 through nozzles 29 arranged in the the upper part of the reactor in order to decrease the temperature of the effluent gas, thus reducing the amount of sulfur vapor entrained thereby. Furthermore, it is sometimes the case that when the catalyst suspended in liquid sulfur 22 is accompanied by splashes of the reaction mixture and attaches to the wall of the reactor or that of piping, reaction takes place at that portion to locally elevate the temperature thereof, which could result in the deterioration of the reactor or piping. This disadvantage can be overcome by supplying liquid sulfur via the pipeline 25 so as to be sprayed through the nozzles 29 and flowing away the catalyst attached to the wall of the reactor, for example, and sending the catalyst back to the liquid sulfur 22.

If desired, whole or a part of the gas flowing out from the reactor 21 can be supplied to a hydrogenation reactor 30 arranged on the way to a cooler 31 and heated in the hydrogenation reactor 30 packed with a hydrogenation catalyst in order to further react sulfur vapor entrained by the product gas with hydrogen gas to convert sulfur vapor into hydrogen sulfide. In this case, hydrogen gas may be supplied from the hydrogen source via a pipeline 32 to lower the concentration of sulfur vapor, thus preventing excessive enhancement in temperature due to reaction heat.

The product gas produced in the reactor 21 is fed to the cooler 31 via the pipeline 28 and cooled therein to condense sulfur vapor contained. With respect to condensation, the same method and conditions as used in the preceding embodiment without using catalysts can be used in the present embodiment using catalysts.

Upon cooling, a part of liquid sulfur as a starting material can be supplied via a pipeline 33 to upstream of the cooler 31 or a separator 34 connected to the cooler 31 to promote the cooling of the product gas and bring liquid sulfur in contact with hydrogen sulfide to produce polysulfide ($H_2S_x$), thus lowering the viscosity of liquid sulfur.

The cooled product gas is passed to the separator 34 where liquid sulfur is removed therefrom and product gas composed mainly of hydrogen sulfide is taken out via a pipeline 35. In this case, when the cooling temperature in the cooler 31 is higher than the temperature of liquid sulfur as a starting material, the liquid sulfur is supplied to the gas phase in the separator 34 via a pipeline 36 to wash the sulfur vapor which remains in the product gas to thereby enhance the efficiency of separation.

The product gas taken out from the pipeline 35 is composed mainly of hydrogen sulfide, saturated sulfur vapor and impurity gas such as methane derived from the hydrogen gas as a starting material. The concentration of hydrogen sulfide reaches a high value as high as 90% or more depending on the reaction conditions. When the amount of sulfur vapor is set up to a level not exceeding the amount of saturation, the total amount of the product gas flowing out from the reactor 21 is passed through the hydrogenation reactor 30 to convert substantially all the sulfur vapor to hydrogen sulfide with supplying fresh liquid sulfur (starting material) via the pipeline 26 instead of supplying the liquid sulfur via the pipeline 36 or a pipeline 33.

The liquid sulfur condensed and separated in the separator 34 is recycled to the reactor 21 via the pipelines 24 and/or 25 together with the liquid sulfur supplied via the pipeline 26.

The same effects as those obtained in the previous embodiment shown in FIG. 1 in which no catalyst is used are also obtained according to this embodiment with catalysts in addition to effects attributable to the use of catalysts.

In order to prevent the floating up of the catalyst used the reactor 21 can be changed to those shown in FIGS. 4 to 7 hereinbelow. Other parts of the manufacture apparatus may be substantially the same as those used in the embodiment shown in FIG. 3.

Figure 4:
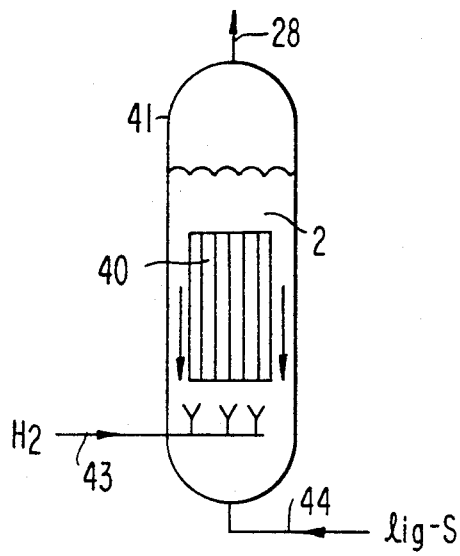
FIGS. 4 to 7 are each a schematical view of a part of a manufacture apparatus used in a process for the manufacture of hydrogen sulfide according to still another embodiment of the present invention.

FIG. 4 shows another embodiment, in which hydrogen and liquid sulfur are supplied via pipelines 43 and 44, respectively, to a reactor 41 containing liquid sulfur 2 in which honeycomb catalyst 40 is immersed, and the reaction is allowed to proceed in the liquid sulfur 2.

In this embodiment, the same effects as those obtained in the embodiment shown in FIG. 3 are obtained. In addition, in this embodiment, the circulation of the liquid sulfur can be achieved by bubbling of the supplied hydrogen gas into the liquid sulfur. Upon stopping the reaction and taking out the liquid sulfur 2 in the reactor 41, the contamination of catalyst powder in the liquid sulfur can be prevented unlike the case where the reactor 41 contains suspended catalysts.

Figure 5:
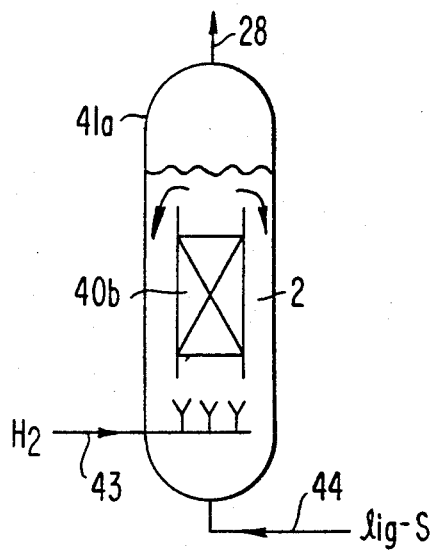

FIG. 5 shows a still another embodiment, in which hydrogen and liquid sulfur are supplied via pipelines 43 and 44 from below a particulate catalyst-filled layer 40b immersed in the liquid sulfur 2 contained in the reactor 41a, and the reaction is allowed to proceed in the liquid sulfur 2.

In this embodiment, substantially the same effects as those obtained in the embodiment shown in FIG. 4 can be obtained. However, some measure is to be taken in order to prevent the movement of catalyst particles accompanied by upward movement of liquid sulfur since liquid sulfur has a high density as high as 1.8 g/cm$^3$.

Figure 6:
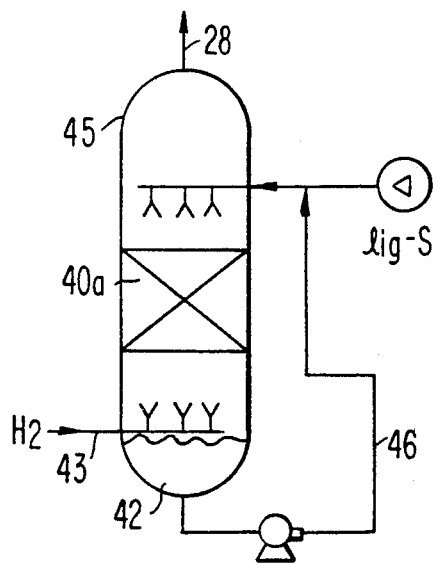

FIG. 6 shows a yet another embodiment, in which a reactor 45 provided with a fixed bed catalyst containing the honeycomb catalyst 40 or particulate catalyst-filled layer 42, and liquid sulfur and hydrogen gas are supplied to the reactor 45 from above and from below, respectively, the fixed bed catalyst 40a, so that the reaction can proceed while liquid sulfur flows down on the surface of the fixed bed catalyst 40a. The liquid sulfur 2 which remains in the lower part of the reactor 45 is recycled to the upper part of the fixed bed catalyst 40a via a pipeline 46.

In this embodiment, in comparison with the embodiments shown in FIGS. 3 to 5, the amount of liquid sulfur 2 which remains in the reactor 45 can be reduced, and the temperature of the product gas which flows out from the reactor 45 can be decreased. These result in the reduction of the amount of sulfur vapor entrained by the product gas. However, it is necessary to adjust the temperature inside the reactor 45, and the amount of liquid sulfur or hydrogen gas to be supplied so that the flowing down of liquid sulfur will not stagnate or liquid sulfur will not overflow.

Figure 7:
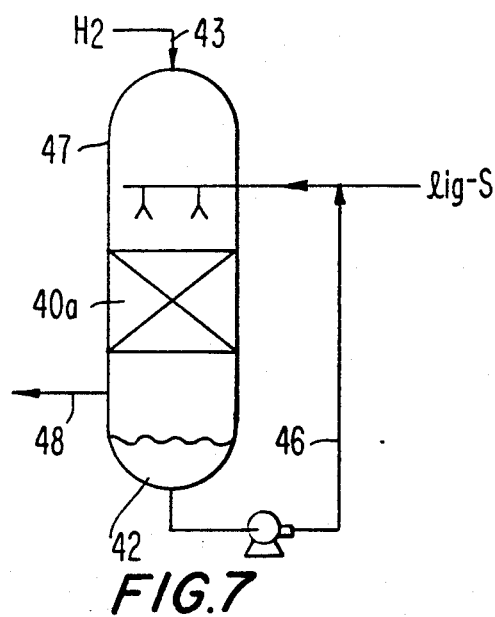

FIG. 7 shows another embodiment, in which a reactor 47 is used which is provided with a fixed bed catalyst 40a and liquid sulfur and hydrogen gas are supplied both from the upper part of the fixed bed catalyst 40a, and the reaction is allowed to proceed while the liquid sulfur flows down on the surface of the fixed bed catalyst 40a, with product gas being taken out from below the middle part of the reactor 47 via a pipeline 48.

In this embodiment, substantially the same effects as those obtained in the embodiment shown in FIG. 6 are obtained, and in addition, obstruction in the flowing down of liquid sulfur and overflow of liquid sulfur can be prevented effectively.

The present invention will be described in greater detail with reference to the following examples which are exemplary and should in no way be construed as limiting the present invention.

EXAMPLE 1

In a stainless steel reactor having an inner diameter of 155 mm and a height of 3,000 mm was introduced liquid sulfur, and hydrogen gas was supplied at the bottom of the apparatus at a rate of 5.3 Nm$^3$/hr., with maintaining the temperature at 360° C. The reaction proceeded at a pressure 3.0 Kg/cm$^2$G (gauge pressure). Subsequently, the gas at the outlet of the apparatus was cooled to a temperature of 140° to 150° C. to condense and remove sulfur vapor, and then the pressure was reduced to atmospheric pressure via a pressure control valve. The resulting gas was further cooled to 40° C. to obtain a mixed gas composed of H$_2$S and H$_2$. H$_2$S content (%) in the mixed gas was measured for cases where the depth of liquid sulfur was set up to 500 mm, 1,000 mm and 1,500 mm, respectively. The results obtained are shown in Table 1 below.

TABLE 1

| Depth of Liquid Sulfur | Concentration of H$_2$S |
|---|---|
| 500 mm | 2.3 vol. % |
| 1,000 mm | 4.1 vol. % |
| 1,500 mm | 5.8 vol. % |

The results in Table 1 confirm that the concentration of H$_2$S increases as the contact between liquid sulfur and hydrogen gas is increased by increasing the depth of liquid sulfur.

EXAMPLE 2

The same procedures as in Example 1 were repeated except that the reaction temperature was changed to 280° C., 300° C., 326° C., 351° C. or 398° C. and the depth of liquid sulfur was fixed to 1,000 mm. The concentration of H$_2$S at each temperature was measured and the results obtained are shown in Table 2 below.

TABLE 2

| Reaction Temperature | Concentration of H$_2$S |
|---|---|
| 280° C. | 0.4 vol. % |
| 300° C. | 0.7 vol. % |
| 326° C. | 1.7 vol. % |
| 351° C. | 3.2 vol. % |
| 398° C. | 11.8 vol. % |

The results in Table 2 confirm that the concentration of H$_2$S increases at increased temperatures.

EXAMPLE 3

Manufacture of H$_2$S was performed in the same manner as in Example 1 except that the depth of liquid sulfur was fixed to 1,000 mm and the reaction pressure was set up to 1 Kg/cm$^2$G, 3 Kg/cm$^2$G, 5 Kg/cm$^2$G, 10 Kg/cm$^2$G or 20 Kg/cm$^2$G. The concentration of H$_2$S at each reaction pressure was measured and the results obtained are shown in Table 3 below.

TABLE 3

| Reaction Pressure | Concentration of H$_2$S |
|---|---|
| 1 Kg/cm$^2$G | 2.0 vol. % |
| 3 Kg/cm$^2$G | 4.2 vol. % |
| 5 Kg/cm$^2$G | 8.0 vol. % |
| 10 Kg/cm$^2$G | 13.5 vol. % |
| 20 Kg/cm$^2$G | 30.0 vol. % |

The results shown in Table 3 confirm that increase in the reaction pressure results in increased concentration of H$_2$S.

EXAMPLE 4

Figure 8:
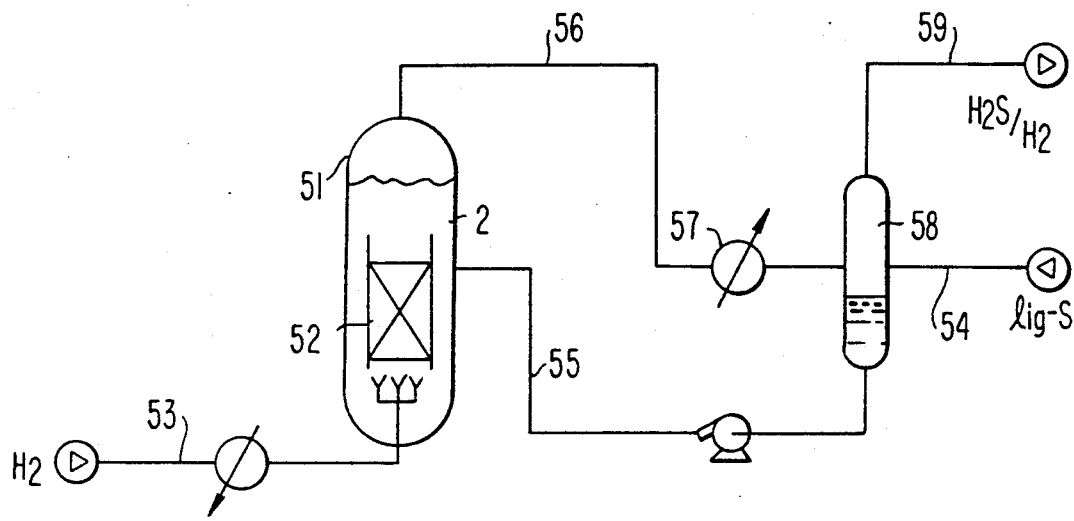
FIG. 8 is a schematical view of a manufacture apparatus used in a process for the manufacture of hydrogen sulfide according to yet another embodiment of the present invention.

Using an apparatus shown in FIG. 8, hydrogen sulfide was manufactured according to the process of the present invention. The reactor 51 contained liquid sulfur 2 in which a particulate catalyst-filled layer 52 was immersed which was filled with Co-Mo based sulfide catalyst supported on alumina (particle size: 3 to 5 mm). In the reactor was supplied 5.0 Nm$^3$/Hr of hydrogen gas heated at 90° C. via a pipeline 53. On the other hand, 6.9 Kg/Hr of liquid sulfur was supplied to the separator 58 via a pipeline 54 and it was supplied to the reactor 51 together with 12.6 Kg/Hr of a recycling liquid sulfur from the separator 58 through a pipeline 55. Then, reaction was performed in the liquid sulfur 2 under the conditions of a temperature of 380° C. and a pressure of 3 Kg/cm$^2$.

The product gas flowing out from the reactor 51 via the pipeline 56 was cooled to 140° C. using a cooler 57 to condense and remove the sulfur vapor contained in the product gas using the separator 58 while the product gas was taken out via a pipeline 59. The product gas obtained had a composition shown in Table 4.

Figure 9:
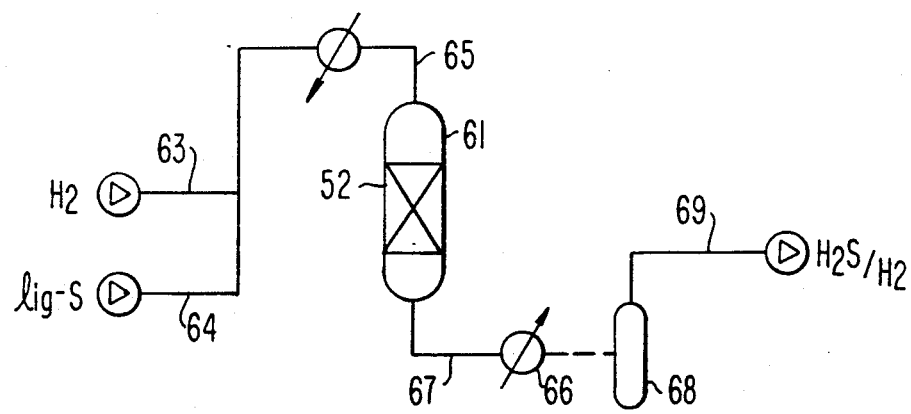
FIG. 9 is a schematical view of a manufacture apparatus used in a conventional process for the manufacture of hydrogen sulfide.

For comparison, an apparatus shown in FIG. 9 was used and hydrogen sulfide was manufactured according to conventional process in which gas phase contact reaction between sulfur and hydrogen. In this comparison, a reactor 61 was used which contained the same particulate catalyst-filled layer 52 as used in the above example shown in FIG. 8, and 50 $Nm^3$/Hr of hydrogen gas supplied via a pipeline 63 and 5.8 Kg/Hr of liquid sulfur supplied via a pipeline 64 were mixed therein followed by heating to a temperature of 300° C. to form a mixed gas, which then was fed to the reactor 61 via a pipeline 65 for reaction. The temperature at the outlet of the reactor 61 increased to 380° C. due to reaction heat generated. The reaction pressure was 3 $Kg/cm^2G$. The product gas flowing out from the reactor 61 was fed to a cooler 66 via a pipeline 67 and cooled down to 40° C., and thereafter the product gas was passed through a separator 68 and taken out via a pipeline 69. No liquid sulfur was found in the separator 68 since all the sulfur contained in the starting material was converted to hydrogen sulfide. The composition of the product gas obtained was analyzed in the same manner as in the above example shown in FIG. 8, and the results obtained are shown in Table 4 below.

TABLE 4

|  | Comparison | Invention |
|---|---|---|
| $H_2$ | 91.9% | 3.2% |
| $H_2S$ | 8.1% | 96.8% |
| Flow Rate of $H_2$ in Starting Material ($Nm^3$/Hr) | 50 | 5 |
| Flow Rate of $H_2S$ Produced ($Nm^3$/Hr) | 4.05 | 4.84 |

The results in Table 4 show that hydrogen sulfide of high concentration can be obtained with ease according to the process of the present invention. It is also clear that for manufacturing the same amount of hydrogen sulfide, the flow rate of $H_2$ as a starting material in the present invention is 1/10 time as much as that used in the comparison process.

What is claimed is:

1. A process for the manufacture of hydrogen sulfide by reacting sulfur and hydrogen comprising the steps of:
   (a) supplying a first stream of hydrogen gas in a first hydrogenation reactor containing sulfur, said sulfur being at least in part as molten sulfur at a first temperature ranging between about 300° C. and about 450° C.;
   (b) reacting said molten sulfur and said first stream of hydrogen gas at a pressure of 0.3 to 30 $kg/cm^2$ G in said first hydrogenation reactor to produce a first effluent gas comprising hydrogen sulfide and unreacted sulfur vapor from said first hydrogenation reactor, said unreacted sulfur vapor having been formed by gasification of molten sulfur using heat generated by said first hydrogenation reaction;
   (c) supplying a second stream of hydrogen gas into said first effluent gas in a second hydrogenation reactor;
   (d) reacting said stream of second hydrogen gas with said unreacted sulfur vapor in said first effluent gas at a second temperature within the range of 200° to 300° C. to form a second effluent gas containing additional hydrogen sulfide; and
   (e) recovering hydrogen sulfide from said second effluent gas.

2. The process according to claim 1, wherein step (b) is performed at a pressure of 3 to 30 $kg/cm^2$ G.

3. The process according to claim 1, wherein step (e) is performed by passing said second effluent gas from said second reactor through a condenser to condense residual unreacted sulfur vapor contained in said second effluent gas.

4. The process according to claim 3, wherein the condensed residual unreacted sulfur is supplied to said first reactor at the upper portion thereof.

5. The process according to claim 1, wherein step (b) is performed in the presence of a catalyst selected from the group consisting of oxides and sulfides of cobalt-molybdenum, nickel-molybdenum, nickel sulfide and combinations of the foregoing.

6. The process according to claim 5, wherein said catalyst is used in the form of a fixed bed catalyst.

7. The process according to claim 1, wherein said first stream of hydrogen gas is supplied at the lower portion of said first reactor.

8. The process according to claim 7, further comprising dividing a source of hydrogen gas into first and second hydrogen gas streams prior to said step (a).

9. The process according to claim 1, wherein step (d) is performed in the presence of a catalyst selected from the group consisting of oxides and sulfides of cobalt-molybdenum, nickel-molybdenum, nickel sulfide, and combinations of the foregoing.

10. The process according to claim 9, wherein said catalyst is used in the form of a fixed bed catalyst.

11. A process for the manufacture of hydrogen sulfide by reacting sulfur and hydrogen comprising the steps of:
   (a) supplying a first stream of hydrogen gas in a first hydrogenation reactor containing sulfur, said sulfur being at least in part as molten sulfur at a first temperature ranging between about 300° C. and about 450° C.;
   (b) reacting said molten sulfur and said first hydrogen gas at a pressure of 0.3 to 30 $kg/cm^2$ G in said first hydrogenation reactor to produce a first effluent gas comprising hydrogen sulfide and unreacted sulfur vapor from said first hydrogenation reactor, said unreacted sulfur vapor having been formed by gasification of molten sulfur using heat generated by said first hydrogenation reaction;
   (c) supplying a second stream of hydrogen gas into said first effluent gas in a second hydrogenation reactor;
   (d) reacting said second hydrogen gas with said unreacted sulfur vapor in said first effluent gas at a second temperature within the range of 200° to 250° C. in the presence of a catalyst to form a second effluent gas containing additional hydrogen sulfide, said catalyst selected from the group consisting of oxides and sulfides of cobalt-molybdenum, nickel-molybdenum and nickel-sulfide and combinations of the foregoing; and
   (e) recovering hydrogen sulfide from said second effluent gas by passing said second effluent gas through a condenser to condense residual unreacted sulfur vapor contained in said second effluent gas.

12. The process according to claim 11, wherein said condensed residual sulfur of step (e) is supplied to said first reactor.